(12) United States Patent
Dolgin et al.

(10) Patent No.: US 7,226,185 B2
(45) Date of Patent: Jun. 5, 2007

(54) ILLUMINATION SYSTEM WITH ALIGNMENT MECHANISM AND METHOD

(75) Inventors: Michael Dolgin, Cincinnati, OH (US); Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 11/021,733

(22) Filed: Dec. 23, 2004

(65) Prior Publication Data

US 2006/0139918 A1 Jun. 29, 2006

(51) Int. Cl.
*F21V 21/14* (2006.01)
(52) U.S. Cl. ............... 362/239; 362/281; 362/449; 362/455
(58) Field of Classification Search ............... 362/311, 362/239, 244, 250, 281, 419, 422, 449, 455
See application file for complete search history.

(56) References Cited

U.S. PATENT DOCUMENTS

| | | | | |
|---|---|---|---|---|
| 2,649,535 | A | * | 8/1953 | Feder ............ 362/275 |
| 4,025,777 | A | * | 5/1977 | Hayakawa ............ 362/250 |
| 4,760,507 | A | * | 7/1988 | Lasker et al. ............ 362/239 |
| 4,826,269 | A | * | 5/1989 | Streifer et al. ............ 359/19 |
| 5,070,434 | A | * | 12/1991 | Suman et al. ............ 362/490 |
| 5,365,415 | A | * | 11/1994 | Schmitt et al. ............ 362/530 |
| 5,386,349 | A | * | 1/1995 | Wheat et al. ............ 362/530 |
| 5,388,035 | A | * | 2/1995 | Bodem, Jr. ............ 362/244 |
| 5,625,738 | A | | 4/1997 | Magarill |
| 5,896,093 | A | * | 4/1999 | Sjobom ............ 362/244 |
| 5,999,749 | A | * | 12/1999 | Kobayashi et al. ............ 396/106 |
| 6,005,704 | A | | 12/1999 | Chmielewski, Jr. et al. |
| 6,033,087 | A | * | 3/2000 | Shozo et al. ............ 362/244 |
| 6,111,705 | A | | 8/2000 | Rohlfing |
| 6,332,688 | B1 | | 12/2001 | Magarill |
| 6,364,506 | B1 | | 4/2002 | Gallo |
| 6,443,594 | B1 | | 9/2002 | Marshall et al. |

(Continued)

FOREIGN PATENT DOCUMENTS

JP 20004221042 8/2000

(Continued)

OTHER PUBLICATIONS

U.S. Appl. No. 10/726,244, entitled "Reflective Light Coupler" filed Dec. 2, 2003.

(Continued)

*Primary Examiner*—Sandra O'Shea
*Assistant Examiner*—Ismael Negron
(74) *Attorney, Agent, or Firm*—George W. Jones (57) ABSTRACT

An illumination system including a plurality of light source modules each including a light-emitting surface and a dome lens, an illumination target and at least one optical device disposed between at least one of the light source modules and the illumination target. Each optical device includes an alignment mechanism engaging the dome lens, and at least one optical element fixed to the alignment mechanism, the optical element having an optical axis. The alignment mechanism is releasably securable between a first position and a second position relative to the dome lens for adjusting the optical device between the first position where the optical axis passes through the light-emitting surface and the illumination target, and second position where the optical axis passes through the light-emitting surface.

23 Claims, 5 Drawing Sheets

U.S. PATENT DOCUMENTS

| | | |
|---|---|---|
| 6,474,839 B1 | 11/2002 | Hutchison |
| 6,578,994 B1* | 6/2003 | Beyerlein .................... 362/239 |
| 6,953,274 B2* | 10/2005 | Rice ........................... 362/526 |
| 2002/0060910 A1* | 5/2002 | Knight ........................ 362/250 |
| 2002/0093825 A1* | 7/2002 | Bailey ......................... 362/473 |
| 2002/0191396 A1* | 12/2002 | Reiff et al. .................. 362/244 |
| 2003/0071581 A1 | 4/2003 | Panagotacos et al. |
| 2003/0117797 A1* | 6/2003 | Sommers et al. ........... 362/244 |
| 2005/0174768 A1* | 8/2005 | Conner ....................... 362/235 |
| 2005/0237740 A1* | 10/2005 | Watanabe et al. ........... 362/244 |

FOREIGN PATENT DOCUMENTS

| | | |
|---|---|---|
| JP | 2003-330109 | 11/2003 |
| WO | WO 99/25031 | 5/1999 |
| WO | WO 01/43113 | 6/2001 |
| WO | WO 2005/084038 | 9/2005 |

OTHER PUBLICATIONS

U.S. Appl. No. 10/776,152, entitled Illumination System filed Feb. 11, 2004.

U.S. Appl. No. 10/776,390, entitled "Light-Collecting Illumination System", filed Feb. 11, 2004.

U.S. Appl. No. 10/776,155, entitled "Reshaping Light Source Modules and Illumination Systems Using the Same," filed Feb. 11, 2004.

* cited by examiner

ILLUMINATION SYSTEM WITH ALIGNMENT MECHANISM AND METHOD

FIELD OF THE INVENTION

The present disclosure relates to illumination systems, which may be used, for example, in projection. More specifically, the disclosure relates to illumination systems that include a plurality of light source modules and a system of optical elements that can be adjusted in physical relation to the light source modules.

BACKGROUND

Illumination systems have a variety of applications, including projection display systems, backlights for liquid crystal displays (LCDs) and others. Projection display systems usually include a source of light, illumination optics, an image-forming device, projection optics and a projection screen. The illumination optics collect light from a light source and direct it to one or more image-forming devices in a predetermined manner. The image-forming device(s), controlled by an electronically conditioned and processed video signal (typically digital), produces an image corresponding to the video signal. Projection optics then magnify the image and project it onto the projection screen. White light sources, such as arc lamps, in conjunction with color wheels have been used as light sources for projection display systems. However, recently, light emitting diodes (LEDs) were introduced as an alternative. Some advantages of LED light sources include longer lifetime, higher efficiency, superior thermal characteristics and better color gamut.

One example of an image-forming device frequently used in digital light processing systems is a digital micro-mirror device (DMD). The main feature of a DMD is an array of rotatable micro-mirrors. The tilt of each mirror is independently controlled by the data loaded into the memory cell associated with each mirror, to steer reflected light and spatially map a pixel of video data to a pixel on a projection screen. Light reflected by a mirror in an ON state passes through the projection optics and is projected onto the screen to create a bright field. On the other hand, light reflected by a mirror in an OFF state misses the projection optics, which results in a dark field. A color image also may be produced using a DMD, e.g., utilizing color sequencing, or, alternatively, using three DMDs, one for each primary color.

Other examples of image-forming devices include liquid crystal panels, such as a liquid crystal on silicon device (LCOS).

In liquid crystal panels, the alignment of the liquid crystal material is controlled incrementally (pixel-to-pixel) according to the data corresponding to a video signal. Depending on the alignment of the liquid crystal material, polarization of the incident light may be altered by the liquid crystal structure. Thus, with appropriate use of polarizers or polarizing beam splitters, dark and light regions may be created, which correspond to the input video data. Color images have been formed using LCOS panels in a manner similar to the DMDs.

Another type of an image-forming device is a high temperature polysilicon liquid crystal device (HTPS-LCD). HTPS-LCD also includes a liquid crystal layer, in which the alignment can be controlled incrementally (pixel-to-pixel), as determined by the data corresponding to a video signal. The liquid crystal layer is sandwiched between a glass substrate and an array of transparent electrodes, thus being adapted for operation in transmission. Typically, at the comer of each HTPS-LCD pixel, there is a microscopic thin film transistor.

SUMMARY

The invention is an illumination system including a plurality of light source modules, each light source module includes a light-emitting surface and a dome lens. Additionally, the illumination system includes an illumination target and at least one optical device disposed between at least one of the light source modules and the illumination target. Each optical device includes an alignment mechanism engaging the dome lens. Additionally, each optical device includes at least one optical element having optical power such as a lens, fixed to the alignment mechanism, the optical element having an optical axis. The alignment mechanism is releasably securable between a first position and a second position relative to the dome lens. The optical device is adjustable between the first and second position. In the first position, the optical axis passes through the light-emitting surface and through the illumination target, and in the second position, the optical axis passes through the light-emitting surface.

An alternate embodiment of the invention is an optical device used with a light emitting diode (LED), the LED having a light-emitting surface and a dome lens. The LED is mounted to a substrate. The optical device includes an alignment mechanism engagable with the dome lens. Additionally, at least one lens is fixed to the alignment mechanism, and the lens has an optical axis. The alignment mechanism is releasably securable between a first position and a second position relative to the dome lens. In the first position the optical axis passes through the light-emitting surface, and in the second position the optical axis passes through the light-emitting surface.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein like structure is referred to by like numerals.

DETAILED DESCRIPTION

Illumination optics in traditional illumination systems has exhibited insufficient collection characteristics. In particular, if a significant portion of a light source's output emerges at angles that are far from the optical axis of the illumination optics (which is the case for most LEDs) conventional illumination systems fail to capture a substantial portion of such light.

It is therefore beneficial to construct an illumination system having a collection system that is easily configured to collect and direct light emitted from the light source (such as LEDs) towards the next element in the illumination system, such as a homogenizer (e.g. a light tunnel).

Figure 1:
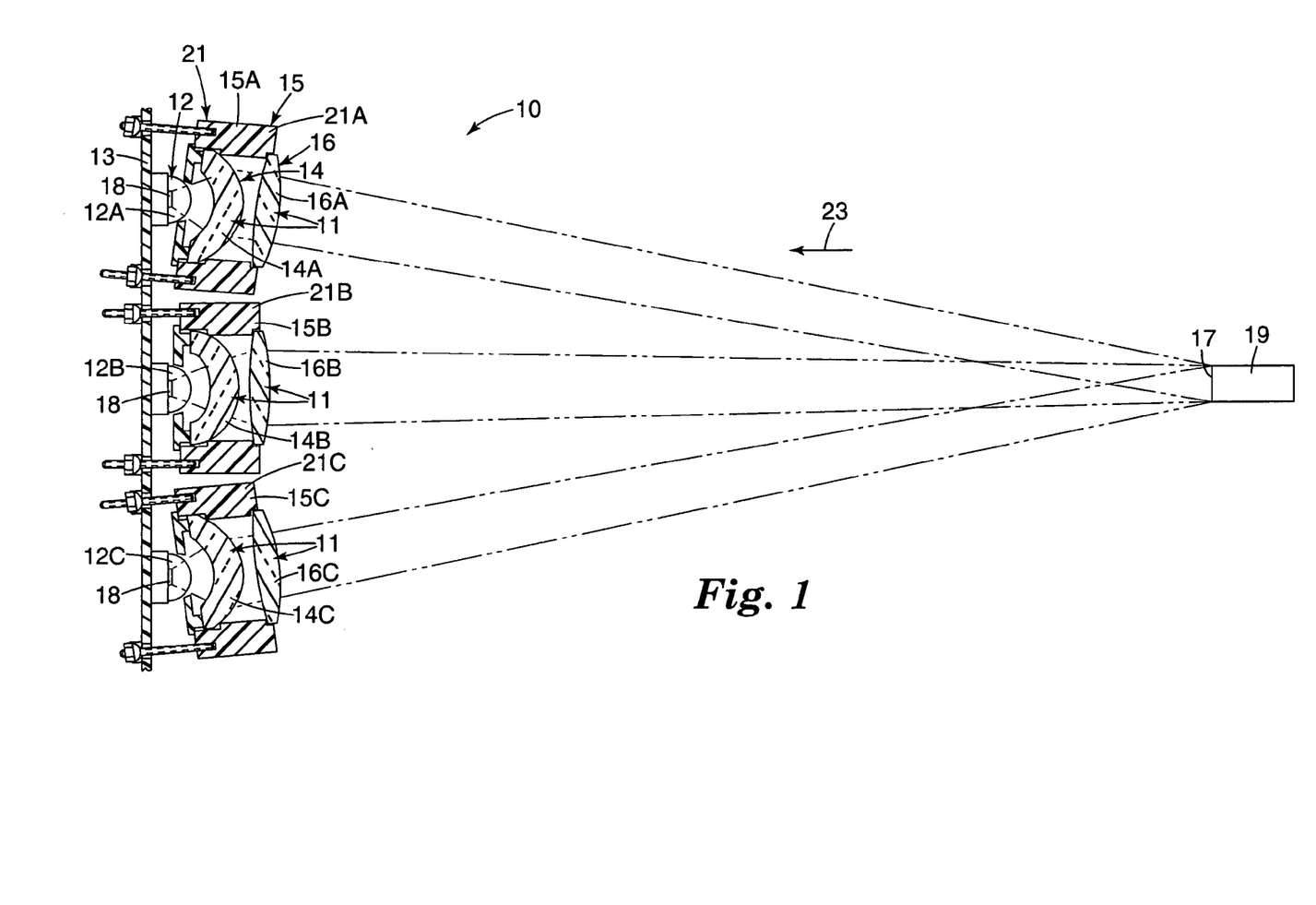
FIG. 1 is a cross-sectional view of an illumination system constructed according to an exemplary embodiment of the present disclosure.

Referring now to the drawings, wherein like reference numbers designate similar elements, FIG. 1 shows schematically an exemplary embodiment of illumination system 10 of the present disclosure, which may be used for projection applications. Projection applications include front projection systems and rear projection systems (such as rear projection televisions). The illumination system 10 shown in FIG. 1 includes a set of light source modules illustrated by light source modules 12A, 12B, 12C (referred to collectively as "light source modules 12"), and a system of optical devices 15A, 15B and 15C (referred to collectively as "optical devices 15"). While three light source modules 12 and optical devices 15 are illustrated, any number of light source modules and optical devices are contemplated by the current invention. One or more light source modules may include an LED light source, such as commercially available LED light sources. Those of ordinary skill in the art will appreciate that as LEDs with increased efficiency and output are developed and perfected, such LEDs will be advantageously used in exemplary embodiments of the present disclosure, since LEDs with high maximum light output are usually preferred. Alternatively, organic light emitting diodes (OLEDs), vertical cavity surface emitting lasers (VCSELs) or other suitable light emitting devices may be used without departing from the spirit and scope of the invention.

Light source modules 12 may be configured as an array, and may be mounted on one or more substrates 13 (together or individually) so that the heat generated by light source modules 12 may be readily dissipated by the material of substrate(s) 13. Examples of substrates suitable for mounting the light source modules include metal substrates, printed circuit boards such as metal-core printed circuit boards, flexible circuits such as polyimide film with copper traces, ceramic substrates, and others. While the illustrated embodiment shows light modules mounted in a coplanar fashion on a substantially flat substrate, the current invention may also be used to improve illumination systems utilizing light source modules 12 that are not coplanar (e.g. are mounted on a curved surface, or on multiple flat surfaces not in the same plane).

Those of ordinary skill in the art will appreciate that many configurations of the light source modules are within the scope of the present disclosure. In addition, the number and type of light source modules may vary depending on the application, desired system configuration, dimensions of the system, and the system's output brightness.

Each light source module 12 has an optical device 15 associated with it in order to facilitate collection of light and to achieve the desired imaging characteristics. In the preferred embodiment, each optical device 15 includes at least one optical element 11 having optical power. In the embodiment illustrated in FIG. 1, each optical device 15A, 15B and 15C includes a first lens 14A, 14B and 14C, respectively (referred to collectively as "first lenses 14"). Additionally, each optical device 15A, 15B and 15C includes a second lens 16A, 16B, and 16C, respectively (referred to collectively as "second lenses 16"). These lenses 14 and 16 are optical elements 11 having optical power. Lenses 14 and 16 are adjusted in physical space relative to each light source module 12 to create individually focused and aimed-in light channels. In other words, first and second lenses 14 and 16 direct and focus at least a portion of the light emitted, and more preferably a substantial portion of the light emitted from one or more light source modules onto an illumination target 17, preferably so that they are superimposed on the illumination target to form an illumination patch. In the current embodiment, first lenses 14 are meniscus type and collect and direct the light from each light source module 12 to the second lenses 16 that are biconvex type (or any refractive or diffractive optical element). The light is then focused so as to provide a system of lenses that effectively collect and direct the light emitted from each light source modulus 12 towards illumination target 17. While first lenses 14 are shown as meniscus lenses and second lenses are shown as biconvex lenses, the number and types of lenses in each optical device 15 may vary depending on the application, desired system configuration, desired characteristics of the output light and the desired dimensions of the system.

First lens 14, having a concave side facing the light source and a convex side opposite the light source, is disposed closest to the light source module 12, so that the concave side generally faces the emitting surface. The second lens 16, having a first convex side and a second convex side, is disposed after first lens 14 in the light path.

As one example, dimensions of the lenses 14 include a center thickness of about 4 mm, about 6.6 mm radius of the concave surfaces, and aspheric convex surface (described by the general aspheric equation) with the radius of about 24 mm and with a conic constant of about 11.6. The convex surface is made aspheric in order to reduce aberrations and to avoid the resulting loss of light. Optionally, the concave surface may be made aspheric as well. However, the performance of such lenses is more strongly influenced by the shape of the convex surface. All of first lenses 14, may be substantially the same shape and size, for example, having a substantially round outside diameter of about 12 mm. All of second lenses 16, also may have substantially the same shape and size, for example, a substantially round outside diameter of about 17 mm. The outer dimensions of the first lenses 14 should be sufficiently large to collect a desired amount of light from the set of light source modules 12 and the outer dimensions of the second lenses 16 should be sufficiently large to capture a desired amount of light exiting lense 14. In one embodiment, lenses 16 can be truncated due to space constraints. The material of the lenses is preferably acrylic, but polycarbonate, polystyrene, glass or any other suitable material may be used as well. In general, materials with higher indexes of refraction are preferred, but ultimately the choice will be made depending on the factors important for a particular application, such as cost, moldability, ease of refractive index matching with optical glues or epoxies, etc. Nonetheless, those of ordinary skill in the art will readily appreciate that the overall shape and size of lenses 14 and 16 may vary depending on the specific application, configuration of the system and the system's size.

It should be noted that any number and configuration of optical elements 11 having optical power (i.e. typically lenses) can be used in the current optical devices 15. Other optical elements having optical power would include mirror concentrators or total internal reflection (TIR) concentrators, such as the compound parabolic concentrators described in U.S. patent application Ser. No. 10/726,244, filed Dec. 2, 2003 the disclosure of which is incorporated by reference herein to the extent it is not inconsistent with the present disclosure.

Previously methods for collecting emitted light included pointing the individual light source modules towards an illumination target, attempting to take advantage of whatever directional emission was inherent in the light source (such as an LED), and substantially aligning the illumination optics used to collect the light. Thus, the light source modules were configured so that at least a portion of the emission of each light source module was aimed substantially toward the illumination target. Attempting to point each light source towards the target required individually tilting each light source. This was accomplished, for example, by arranging a set of light source modules tangentially to and along a spherical surface. Placing light source modules on a curved surface is discussed further in U.S. patent application Ser. No. 10/776,152 filed on Feb. 11, 2004, the disclosure of which is incorporated by reference herein to the extent it is not inconsistent with the present disclosure.

One issue with this approach, however, is that a common method for mounting some light source modules, such as LEDs, is to wire them onto a planar substrate. To simplify assembly and wiring of the illumination system 10, and to maximize efficiency and minimize cost of assembly, it is desirable to configure light source modules 12 such that they are not individually pointing at the illumination target (e.g. such as when light source modules 12 are substantially coplanar with each other). In the present invention, light from one or more of light source modules 12 is focused onto the same illumination target by aiming the individual light channels (i.e. from each light source module 12) onto illumination target 17 using optical devices 15 to properly align optical elements 11 relative to light source modules 12. This manner of directing the light allows for use of fewer parts, can lower cost, can be more efficient, and in some embodiments can result in brighter output than other types of direction of light (e.g. by utilizing shared condensers).

In the embodiment illustrated in FIG. 1, optical devices 15 are configured to image emitting surface 18 of each light source module 12 onto the illumination target 17. The emission of each light source module 12 is directed toward illumination target 17 by appropriately positioning the system of optical devices 15, which in this exemplary embodiment includes first lenses 14 and second lenses 16. The "aiming-in" of individual channels may be accomplished by mounting optical devices 15 in such a manner as to precisely position the lenses (e.g. first lenses 14 and second lenses 16) with respect to each light source module 12 to image each emitting surface 18 of each light source module 12 onto illumination target 17. Mounting optical devices 15 in such a manner as to precisely position the lenses (e.g. first lenses 14 and second lenses 16) to image each emitting surface 18 of each light source module 12 onto the illumination target 17 requires fine rotation and displacement adjustments to correctly align lenses 14 and 16 with respect to the LED.

In the current invention, each optical devices 15A, 15B and 15C includes alignment mechanism 21A, 21B and 21C (referred to collectively as "alignment mechanism 21"). Alignment mechanisms 21 support lenses 14 and 16 as well as providing an efficient and cost effective way to align lenses 14 and 16 without requiring additional guiding mechanisms. Alignment mechanism 21 accomplishes this by using the associated light source module 12 as a base for centering and rotation. This is discussed in further detail with respect to FIGS. 2 and 3.

Those of ordinary skill in the art will readily appreciate that the number and type of light source modules and of the optical devices associated with the light source modules, thus forming individual aimed-in channels, may also vary depending on the application, desired system configuration and the dimensions of the system.

The nature of illumination target 17 will vary depending on the specific application, for example, the illumination target 17 may be an entrance to light tunnel 19 as illustrated in FIG. 1. In other exemplary embodiments, illumination target 17 may be an image-forming device, (e.g., a DMD, a liquid crystal panel or one or more pixels or color zones of a liquid crystal display (LCD)).

Exemplary light tunnels suitable for use with the present disclosure are described, for example, in U.S. Pat. Nos. 5,625,738 and 6,332,688, the disclosures of which are hereby incorporated by reference herein to the extent they are not inconsistent with the present disclosure. A light tunnel would serve to homogenize the output of the light emitting modules 12, and thus precise imaging of the emitting surfaces would not be needed in the exemplary embodiments utilizing light tunnels. Light tunnel 19 may be a mirror tunnel, e.g., a rectangular or tapered light tunnel, solid or hollow, such as a solid glass bar that relies on total internal reflection to transfer light through it. Those of ordinary skill in the art will appreciate that numerous shape combinations for the input and output ends of the light tunnels are possible.

It should be additionally noted that one or more of emitting surfaces 18 of light source modules 12 may be given a specific shape to improve performance of the illumination system 10. For example, one or more of emitting surfaces 18 may be shaped to match substantially the general shape of the illumination target 17. In particular, if the target 17 is a square entrance of a light tunnel, one or more of emitting surfaces 18 of light source modules 12 also may be generally shaped as squares. If, on the other hand, the target 17 is a rectangular image-forming device or a rectangular color zone or pixel of an LCD, one or more of emitting surfaces 18 of the light source modules 12 also may be generally shaped as rectangles. If the target 17 is a rectangular image-forming device having an aspect ratio of about 16:9 (which is usually the case in high definition televisions), one or more of the emitting surfaces of the light source modules may also be generally shaped as rectangles, preferably with about the same aspect ratios. Alternatively, images of generally square emitting surfaces 18 may be closely packed to substantially fill a rectangular illumination target. It will be readily understood by those of ordinary skill in the art that other shapes of emitting surfaces 18 and of the illumination targets are within the scope of the present disclosure.

The system of optical devices 15 may be designed and configured to appropriately magnify the images of emitting surfaces 18. Performance of a typical projection display usually would benefit from, or in some cases even require, a certain amount of overfill of the illumination target by the light from the emitting surface, which in these exemplary embodiments would be formed by the superimposed images of one or more emitting surfaces 18 of the light emitting modules. For example, for an imaging device of about 20.0×12.0 mm, the coverage of light on target surface 17 may be about 3% larger in each axis, or about 20.6×12.36 mm. In some exemplary embodiments, it is desirable to make the amount of overfill substantially the same on all sides, for example, to accommodate mechanical misalignments. In such cases, one or more of emitting surfaces 18 of the light source modules may be made slightly different in aspect ratio from the illumination target, in order to produce an image of the desired shape. Alternatively, the system of optical elements may include cylindrical lenses or other non-circularly symmetric optics that could convert the image(s) of the emitting surface(s) to a desired general shape or aspect ratio. The shaping of the emitting surface is further described in U.S. patent application Ser. No. 10/776,152, filed on Feb. 11, 2004.

Figure 2:
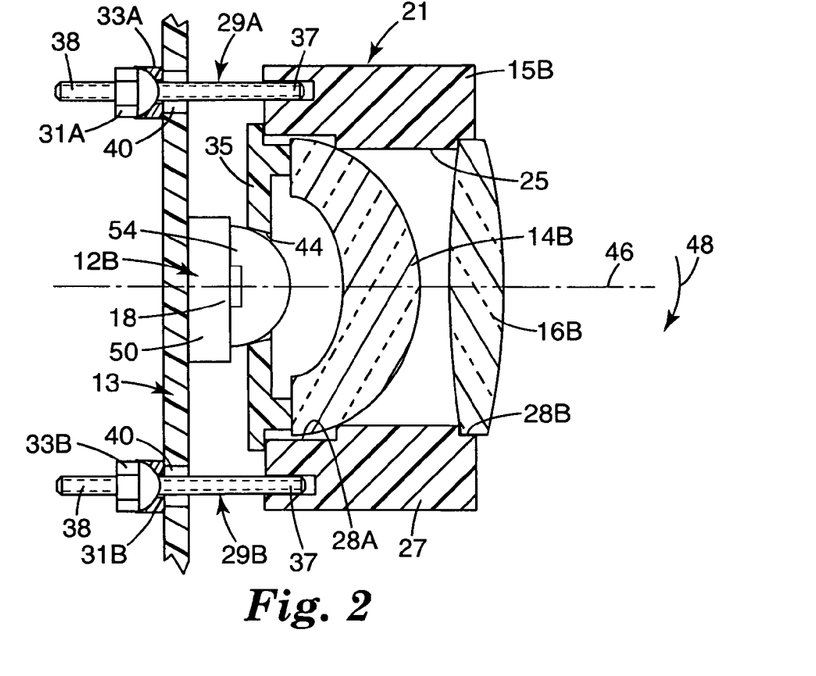
FIG. 2 is a cross-sectional view of a portion of an illumination system constructed according to an exemplary embodiment of the present disclosure, showing a light source module, and an associated optical device in a first position.

FIG. 2 is an enlarged cross-sectional view of a portion of an illumination system constructed according to an exemplary embodiment of the present disclosure, showing light source module 12B and associated optical device 15B of FIG. 1. As discussed previously, optical device 15B includes first lens 14B, second lens 16B and alignment mechanism 21. In this embodiment, light source module 12B is an LED.

Figure 4:
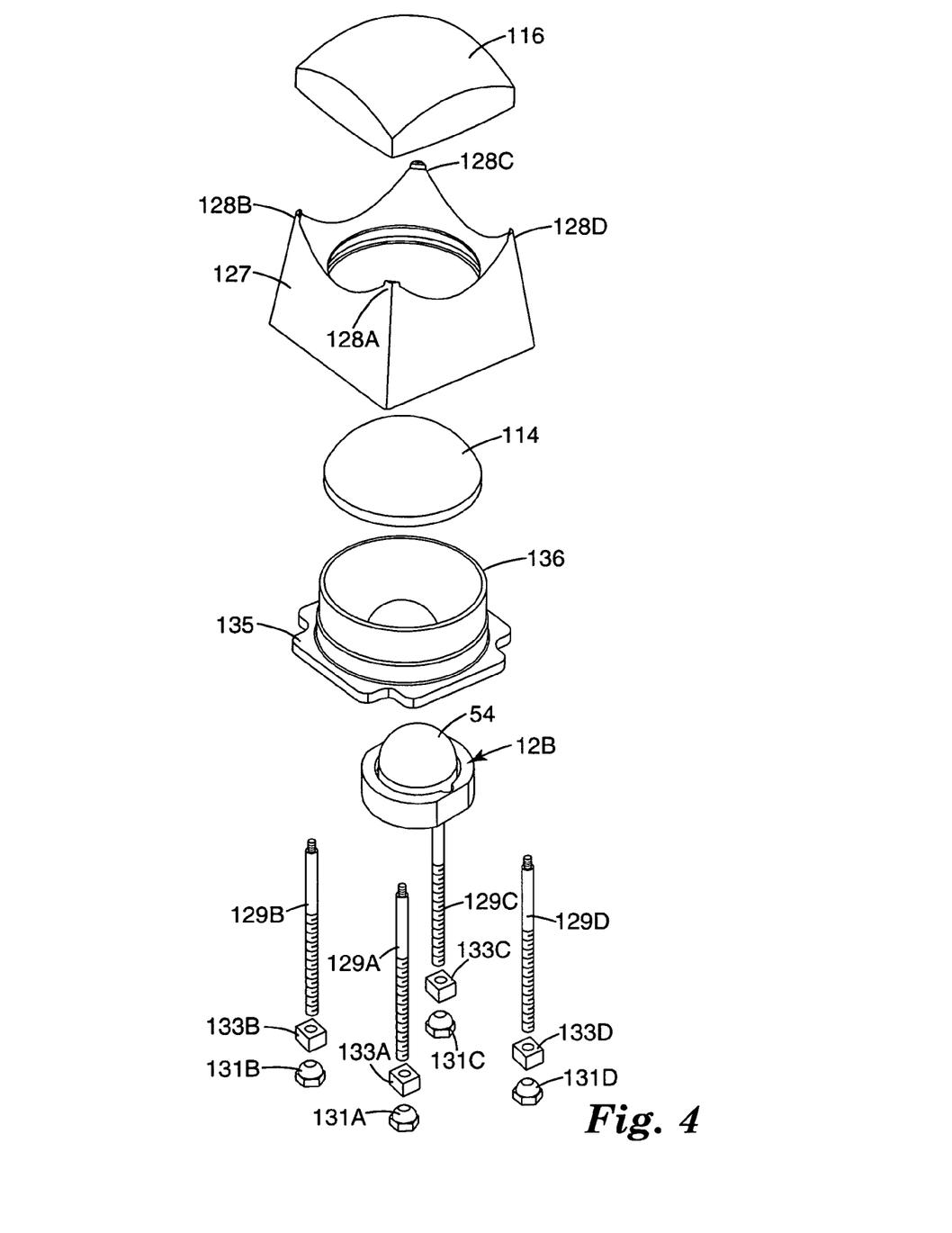
FIG. 4 is a perspective view of an alternate embodiment of a portion of an illumination system, showing a light source module, and an associated optical device.
Figure 5:
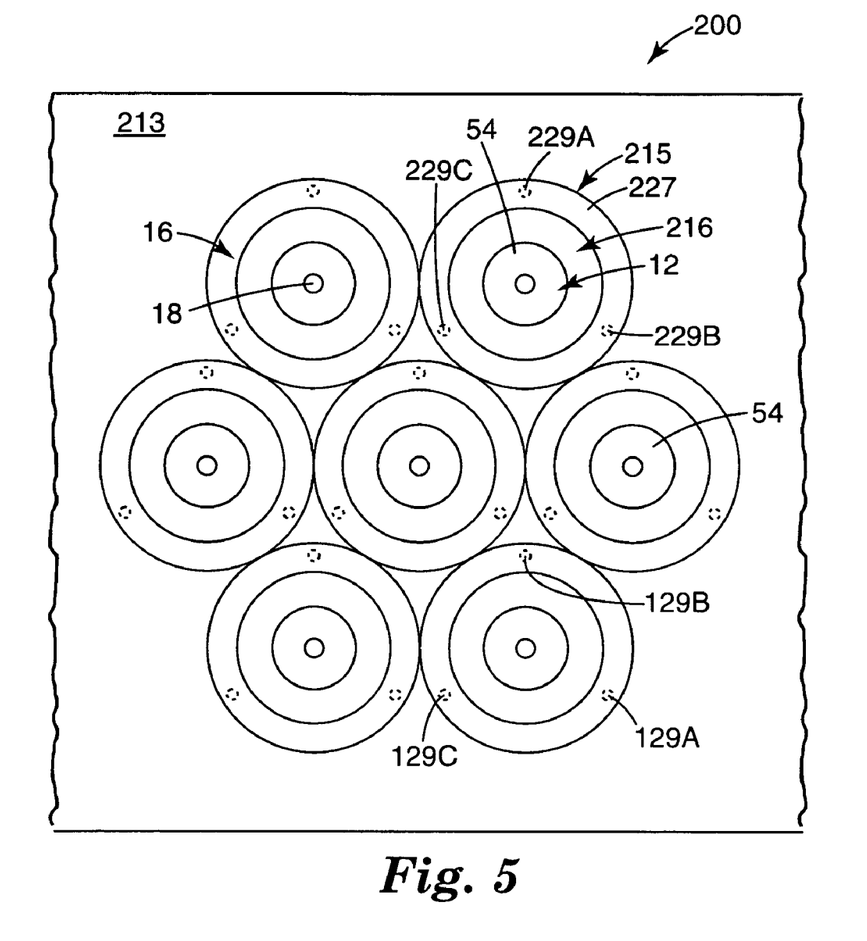
FIG. 5 is a schematic front view of one embodiment of an illumination system having a closely packed array of light source modulus and optical devices.

Alignment mechanism 21 includes barrel 27 having first recess 28A and second recess 28B into which first lens 14B and second lens 16B respectively, are secured. In one embodiment, first and second recess 28A and 28B extend circumferentially about interior surface 25 of barrel 27. Barrel 27 can have a square cross-sectional shape, a hexagonal cross-sectional shape, a circular cross-sectional shape, or any number of other shapes that may be useful in securing lens shapes known in the art. First and second studs 29A and 29B are illustrated as securing barrel 27 to substrate 13. While two studs are illustrated due to the cross sectional view of optical device 15B, any number of studs may be used. Three or four studs (as illustrated in FIGS. 5 and 4, respectively) are used in alternate embodiments of the invention. First end 37 of each stud 29A and 29B extends into and is secured to barrel 27 (e.g. by threading, adhesive, welding, or other methods known to one skilled in the art). Second end 38 of each stud 29A and 29B extends through opening 40 in substrate 13. Nut 31A is threaded onto second end 38 of first stud 29A. Spherical washer 33A is positioned between nut 31A and substrate 13. Nut 31B is threaded onto second end 38 of second stud 29B. Spherical washer 33B is positioned between nut 31B and substrate 13. Stabilizer 35 is secured to inner surface 25 of barrel 27 (e.g., by epoxy) and extends radially inwardly, defining aperture 44. Stabilizer 35 may alternately be referred to as "cover 35" in this disclosure, since in one embodiment of the invention, stabilizer extends radially inwardly from all points along barrel 27 to form a hole (i.e. aperture 44). Other embodiments of stabilizer 35 may only extend radially inwardly from barrel at discrete points forming one or more discrete arms defining aperture 44. Material used for forming stabilizer 35 (or cover 35) may be selected to maximize transmission of light to lenses 14 and 16 (e.g. clear material, transparent material, or non-opaque material). Optical axis 46 defines the direction of light emitted by light source 12B as altered due to the focusing and aiming provided by lenses 14B and 16B.

Figure 3:
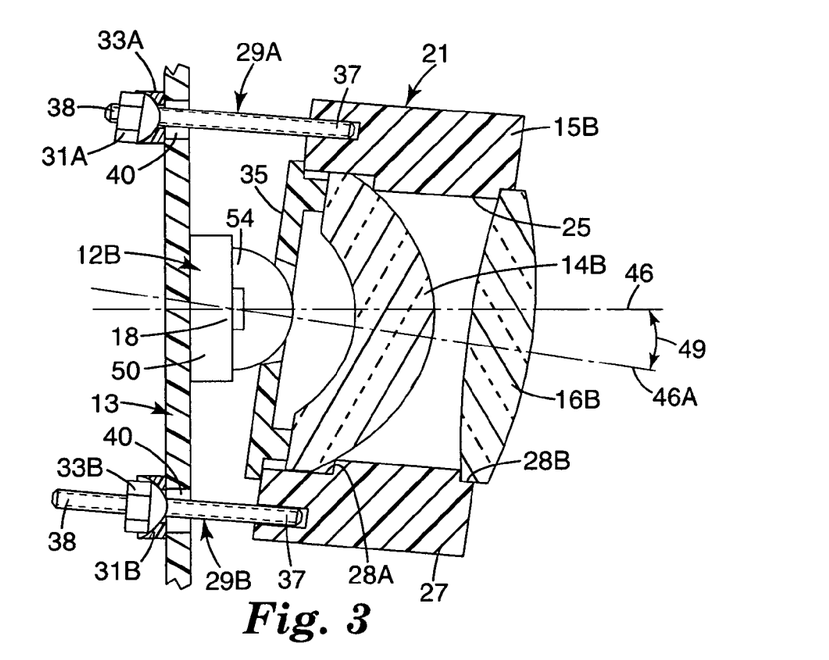
FIG. 3 is the embodiment illustrated in FIG. 2 in a second position.

Moving optical device 15 from a "first position" relative to light source 12B (as illustrated in FIG. 2) to a "second position" (as illustrated in FIG. 3) changes the physical position of lenses 14B and 16B relative to light source 12B. Changing the physical placement of lenses 14B and 16B relative to light source 12 also changes the direction of optical axis 46. In other words, the direction of the light path is altered due to the focusing and aiming provided by lenses 14B and 16B. Compare FIG. 3 optical axis 46A defined by lenses 14B and 16B versus original optical axis 46 defined by lens 14 and 16 in the position illustrated by FIG. 2.

It should be noted that while "first position" and "second position" are discussed and illustrated, alignment mechanism 21 allows for altering the placement of lenses 14 and 16 into any number of positions relative to light source 12B including upward or downward as well as into and out of the page in FIGS. 2 and 3.

In order to assure that the maximum amount of light emitted by light source 12B is collected by lenses 14B and 16B, it is preferable to position optical device 15B such that optical axis 46 passes through any emitter within light source 12B (and preferably substantially through the center of any emitter within light source 12B). As illustrated, light source module 12B is an LED that includes base 50, an emitting surface 18 and a substantially optically clear dome lens 54. Emitting surface 18 is the source of light within the LED. By positioning optical device 15B such that optical axis 46 passes through emitting surface 18 (and preferably substantially through the center of emitting surface 18), it is possible to collect a substantial portion of the light emitted by light source 12B. Causing optical axis 46 to pass through as close to the center of the emitting surface as possible maximizes light collection and precisely images the emitter surface onto target 17. To assure that optical axis 46 passes through emitter (and preferably substantially through the center of emitter), regardless of the position of optical device 15B relative to light source 12B (i.e. LED dome lens 54), it is preferably that light-emitting surface 18 is located substantially at the focal point of dome lens 54. In one preferred embodiment, dome lens 54 is shaped such that all points within about 60 degrees of the optical axis of the outer surface of dome lens 54 are substantially equidistant from light-emitting surface 18.

Emitting surface 18 may be or may include a layer of phosphor, or any other emissive material. Those of ordinary skill in the art will understand that the term "emitting surface" may be used to refer to any light-emitting surface of a light source module, such as any surface portion of a light-emitting semiconductor layer or chip encapsulated into substantially optically clear material.

The unique alignment mechanism 21 can be adjusted so that it is positioned over light source (LED) 12B such that light source 12B extends into aperture 44 until cover 35 engages dome lens 54. The engagement of cover 35 with dome lens 54 of the LED allows alignment mechanism 21 of the optical device 15 to "self align," assuring that optical axis 46 will pass through emitting surface 18 of the LED without the need for additional mechanical elements to assure the position of optical device 15B with respect to light source 12B. To adjust the direction of optical axis 46 (e.g. to direct the light emitted from light source 12B towards illumination target 17, shown previously in FIG. 1.), the operator loosens nuts 31A and 31B to allow cover 35 to freely translate over dome lens 54. If the operator wishes to translate optical axis 46 downwardly (i.e. in the direction of arrow 48 in FIG. 2), in order to direct light towards an illumination target) located below the LED, optical device 15B is rotated downwardly. As illustrated in FIG. 3, optical axis 46 can be rotated through angle 49 to redirect light from LED without altering the physical location of LED light source 12. Cover 35 engages dome lens 54 through aperture 44, maintaining optical axis 46 in a position to extend through emitting surface 18 so as to collect substantially all of the light emitted by emitting surface 18. Nuts 31A and 31B are then retightened, securing alignment mechanism in place due to the clamping force provided between nuts 31A and 31B and cover 35 engaged on dome lens 54. This aligning process can be repeated as necessary by loosening the nuts 31A and 31B and repositioning optical device 15B until proper alignment is attained.

The self-alignment of optical device 15 of the current invention allows for ease in focusing the light of each individual light source 12 without requiring fixed alignment devices secured to substrate 13 (e.g. a printed circuit board). Additionally, each alignment device can be identical in construction since it is capable of being adjusted over any of the light sources 12, regardless of their position relative to the illumination target.

FIG. 4 illustrates an exploded view of an alternate embodiment of optical device 115 shown with light source module 12B. In the illustrated embodiment, four studs 129A, 129B, 129C and 129D and associated spherical washers 133A, 133B, 133C and 133D and nuts 131A, 131B, 131C and 131D are provided to secure optical device 115 in place. Stabilizer 135 is a separate component from barrel 127. First lens 114 is disposed inside barrel 127 and secured in place (e.g. by adhesive and/or mechanical clamping force provided by upper protrusion 136 of cover 135. The pinning force is provided when optical device 115 is secured in place relative to light source 12B when nuts 131A, 131B, 131C and 131D are tightened on studs 129A, 129B, 129C and 129C (similar to the process described with respect to FIGS. 2 and 3).

Second lens 116 is secured to the top of barrel 127. Barrel 127 is substantially rectangular in cross-section. Securing points 128A, 128B, 128C and 128D are provided to engage and retain second lens 116, such as by utilizing known adhesives applied between each point 128A, 128B, 128C and 128D and second lens 116.

FIG. 5 represents a front view of an array of light source modules 12 having associated optical devices 215 in another embodiment of illumination system 200 (e.g. taken in the direction of arrow 23 FIG. 1). In this embodiment, three studs 229A, 229B and 229C are used to secure each optical device 215 to substrate 213 and to adjust each optical device 215 relative to each dome lens 54 of each light source 12. Barrel 227 retains lens 216 in place over light source and is generally circular in cross-section. Illumination system 200 is configured as a double-layered hexagonal closely packed array.

Figure 6:
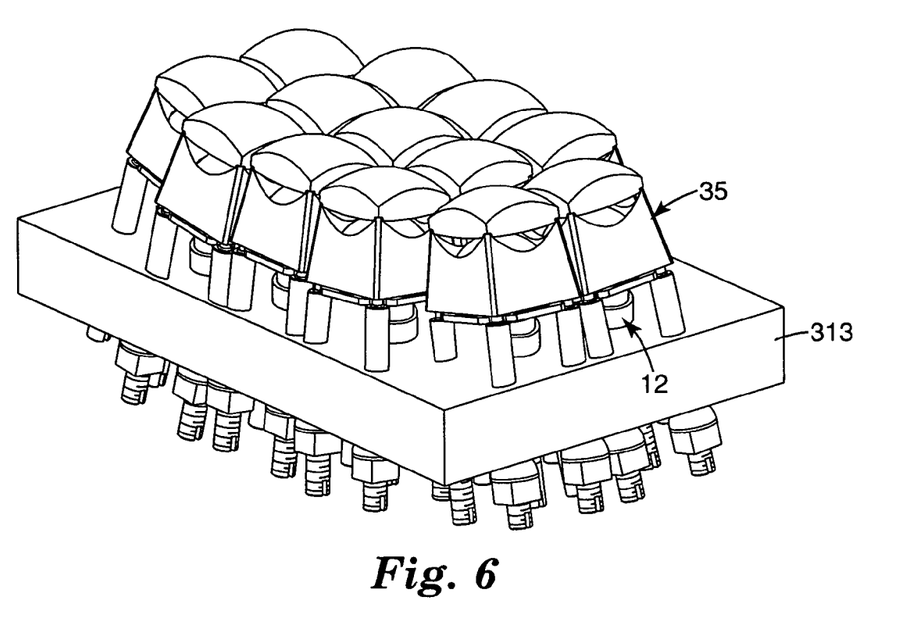
FIG. 6 is a perspective view of an alternate embodiment of an illumination system having a closely packed array of light source modules and optical devices.

FIG. 6 illustrates a perspective view of an array of light source modules 12 having associated optical devices 315 in another embodiment of illumination system 300. In this embodiment, light source modules 12 and optical devices 315 are arranged in a generally rectangular array. Light source modules 12 are mounted in a co-planar arrangement on a substantially flat substrate 313.

Figure 7:
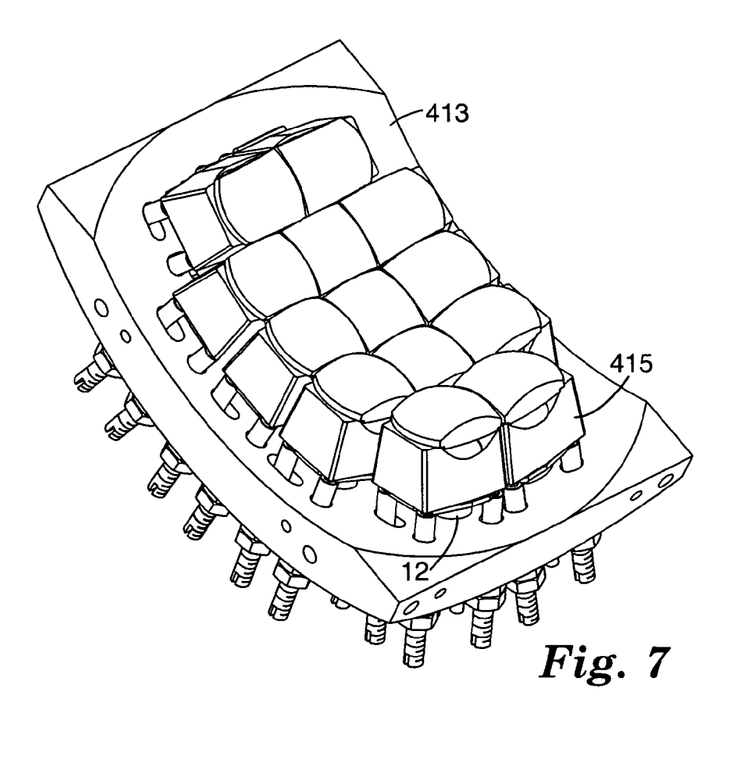
FIG. 7 is a perspective view of another alternate embodiment of an illumination system having a closely packed array of light source modules and optical devices.

FIG. 7 illustrates a perspective view of an array of light source modules 12 having associated optical devices 415 in yet another embodiment of illumination system 400. In this embodiment, light source modules 12 and optical devices 415 are arranged in a generally rectangular array. In this embodiment, however, light source modules 12 and optical devices 415 are mounted on a noticeably curved substrate 413 illustrating the usefulness of optical device 415 even when the mounting of light source modules 12 on to curved substrate 413 provides a certain degree of inherent direction to the light emitted from the light source modules 12.

Other array configurations of light source modules and optical devices are also within the scope of the present disclosure, such as arrays having a square shape (or other shape), depending on the specific application and other considerations. These considerations may include the shape and size of the illumination target, as well as the cost of the system.

Although the illumination systems of the present disclosure have been described with reference to specific exemplary embodiments, those of ordinary skill in the art will readily appreciate that changes and modifications may be made thereto without departing from the spirit and scope of the present invention. For example, dimensions and configurations of the optical devices that are used in various embodiments of the present disclosure can vary depending on the specific application and the nature and dimensions of the illumination target. In addition, the exemplary embodiments of the present disclosure may incorporate optical elements, components and systems described in U.S. application entitled "Light-Collecting Illumination System", Ser. No. 10/776,390, filed Feb. 11, 2004 and U.S. application entitled "Reshaping Light Source Modules and Illumination Systems Using the Same," Ser. No. 10/776,155, filed Feb. 11, 2004 the disclosures of which are hereby incorporated by reference herein to the extent they are not inconsistent with the present disclosure. Further, the present disclosure contemplates inclusion of additional optical elements into exemplary embodiments of the illumination systems constructed in accordance with the present disclosure, as would be known to those of ordinary skill in the art.

Further, those of ordinary skill in the art will readily appreciate that embodiments of the present disclosure may be used with a variety of light sources, including white LEDs, and color LEDs (e.g., red, blue, green or other colors) and multi-chip LED modules, e.g., RGB LED modules. RGB LEDs typically will allow achieving the best color performance, but white LEDs are acceptable for many applications.

What is claimed is:

1. An optical device used with a light emitting diode (LED), the LED having a light-emitting surface and a dome lens and being mounted to a substrate, the optical device comprising:
    an alignment mechanism directly engagable with the dome lens; and
    at least one lens fixed to the alignment mechanism, the at least one lens having an optical axis, wherein the alignment mechanism is positionable between a first position and a second position relative to the dome lens, such that in the first position the optical axis passes through the light-emitting surface and a first point, and in the second position, the optical axis passes through the light-emitting surface and not the first point.

2. The optical device as recited in claim 1, wherein the alignment mechanism further comprises:
    a barrel encompassing and securing the lens; and
    a stabilizer extending radially inward from the barrel forming an aperture so as to allow the dome lens to extend through and engage the stabilizer.

3. The optical device as recited in claim 2 and further comprising:
    a stud extending from the barrel and secured to the substrate.

4. An illumination system, comprising:
    a plurality of light source modules, each light source module comprising a light-emitting surface and a dome lens;

an illumination target; and at least two optical devices, each optical device disposed between at least one of the plurality of light source modules and the illumination target, each optical device including:
- an alignment mechanism directly engaging the dome lens; and
- at least one optical element having optical power and an optical axis fixed to the alignment mechanism, wherein each alignment mechanism is positionable independent of any other alignment mechanism between a first position and a second position relative to the dome lens, such that in the first position the optical axis passes through the light-emitting surface and through the illumination target and in the second position, the optical axis passes through the light-emitting surface and not through the illumination target.

5. The illumination system as recited in claim 1, wherein the optical element having optical power is a lens.

6. The illumination system as recited in claim 1, wherein the illumination target is an entrance of a light tunnel.

7. The illumination system as recited in claim 1, wherein the illumination target is an image-forming device.

8. The illumination system as recited in claim 1, wherein the illumination target is an LCD comprising a plurality of pixels.

9. The illumination system as recited in claim 1, wherein each optical device comprises:
- a pair of lenses associated with each light source module, each pair of lenses configured so that a first meniscus type lens has a concave side and a convex side and a second biconvex type lens has a first convex side and a second convex side and disposed so that the first convex side of the second biconvex type lens is adjacent to the convex side of the first meniscus type lens and the concave side of the first meniscus type lens faces the emitting surface of the associated light source module.

10. The illumination system as recited in claim 1 wherein the plurality of light source modules is disposed in a substantially hexagonally shaped array.

11. The illumination system as recited in claim 1 wherein the plurality of light source modules is disposed in a substantially rectangular shaped array.

12. The illumination system as recited in claim 1, wherein the alignment mechanisms further comprise:
- a barrel encompassing and securing the lens; and
- a stabilizer extending radially inward from the barrel forming an aperture so as to allow the dome lens to extend through and engage the stabilizer.

13. The illumination system as recited in claim 12 and further comprising:
- a substrate on which the light source modules are mounted; and
- a stud extending from the barrel and secured to the substrate.

14. The illumination system as recited in claim 13, wherein the substrate is a printed circuit board.

15. The illumination system as recited in claim 1, wherein the plurality of light source modules are disposed in an array.

16. The illumination system as recited in claim 15, wherein the light source modules are disposed substantially coplanar with each other.

17. The illumination system as recited in claim 15, wherein the light source modules are disposed on a curved substrate.

18. The illumination system as recited in claim 15, wherein the light source modules are mounted on a printed circuit board.

19. The illumination system as recited in claim 15, wherein the light source modules are light emitting diodes.

20. The illumination system as recited in claim 19 wherein all points within about 60 degrees of the optical axis of the outer surface of the dome lens are substantially equidistant from the light-emitting surface.

21. The illumination system as recited in claim 19 wherein the light-emitting surface is located substantially at the focal point of the dome lens.

22. A method for illuminating a target surface including:
- providing a plurality of light source modules having an emitting surface;
- emitting light from the emitting surface;
- providing an illumination target;
- placing an optical device having at least one lens with an optical axis over at least one light source module;
- positioning the optical device in a first position relative to the associated light source, such that the optical axis extends through the emitting surface and not through the target surface;
- adjusting the optical device relative to the associated light source into a second position such that the optical axis extends through the emitting surface and through the target surface; and
- positioning the optical device in the second position.

23. The method of claim 22 and further comprising:
- disposing the plurality of light source modules in a co-planar configuration.

* * * * *

UNITED STATES PATENT AND TRADEMARK OFFICE
CERTIFICATE OF CORRECTION

PATENT NO. : 7,226,185 B2 Page 1 of 1
APPLICATION NO. : 11/021733
DATED : June 5, 2007
INVENTOR(S) : Michael Dolgin et al.

It is certified that error appears in the above-identified patent and that said Letters Patent is hereby corrected as shown below:

Column 2,
Line 6, delete "comer" and insert -- corner --, therefor.

Column 11,
Line 19, delete "claim 1," and insert -- claim 4, --, therefor.
Line 21, delete "claim 1," and insert -- claim 4, --, therefor.
Line 23, delete "claim 1," and insert -- claim 4, --, therefor.
Line 25, delete "claim 1," and insert -- claim 4, --, therefor.
Line 28, delete "claim 1," and insert -- claim 4, --, therefor.
Line 40, delete "claim 1," and insert -- claim 4, --, therefor.
Line 43, delete "claim 1," and insert -- claim 4, --, therefor.
Line 46, delete "claim 1," and insert -- claim 4, --, therefor.

Column 12,
Line 9, delete "claim 1," and insert -- claim 4, --, therefor.

Signed and Sealed this

Thirtieth Day of October, 2007

JON W. DUDAS
*Director of the United States Patent and Trademark Office*